US012264062B1

(12) United States Patent
Kunter et al.

(10) Patent No.: US 12,264,062 B1
(45) Date of Patent: Apr. 1, 2025

(54) FUEL NOZZLE

(71) Applicant: ELAFLEX HIBY GMBH & CO. KG, Hamburg (DE)

(72) Inventors: Stefan Kunter, Hamburg (DE); Michael Wehner, Hamburg (DE); Torben Schörck, Hamburg (DE); Wolfgang Artmeier, Hamburg (DE)

(73) Assignee: ELAFLEX HIBY GMBH & CO. KG, Hamburg (DE)

(*) Notice: Subject to any disclaimer, the term of this patent is extended or adjusted under 35 U.S.C. 154(b) by 0 days.

(21) Appl. No.: 18/837,679

(22) PCT Filed: Feb. 21, 2023

(86) PCT No.: PCT/EP2023/054260
§ 371 (c)(1),
(2) Date: Aug. 12, 2024

(87) PCT Pub. No.: WO2023/161205
PCT Pub. Date: Aug. 31, 2023

(30) Foreign Application Priority Data

Feb. 23, 2022 (EP) .................................... 22158237

(51) Int. Cl.
*B67D 7/42* (2010.01)

(52) U.S. Cl.
CPC ..................................... *B67D 7/42* (2013.01)

(58) Field of Classification Search
CPC .......... B67D 7/42; B67D 7/04; F16L 37/2445
(Continued)

(56) References Cited

U.S. PATENT DOCUMENTS

2011/0232803 A1* 9/2011 Benscoter .............. C12M 23/14
141/392
2011/0272063 A1 11/2011 Tumarkin

FOREIGN PATENT DOCUMENTS

CN 113460944 10/2021
EP 2 386 520 B1 4/2013

OTHER PUBLICATIONS

International Search Report & Written Opinion, International Patent Application No. PCT/EP2023/054260, dated Jun. 2, 2023, 16 pages.

* cited by examiner

*Primary Examiner* — Timothy P. Kelly
(74) *Attorney, Agent, or Firm* — CASIMIR JONES, S.C.; Brian F. Bradley

(57) ABSTRACT

The present invention relates to a dispensing valve for dispensing a fluid, having a housing (13), a main channel (14) which extends therein for the fluid, a main valve which is arranged in the main channel (14) for controlling a fluid throughflow through the dispensing valve, a control device (15) for activating the main valve (20), a component receiving member (16, 16') which is connected to the housing (13) and which is provided with an inner thread and having an attachment (17, 17') which is provided with an outer thread, wherein between the inner thread and the outer thread, a thread connection is produced and wherein an axial position of the attachment (17, 17') can be adjusted by the inner thread being rotated relative to the outer thread. According to the invention the component receiving member (16, 16') and the attachment (17, 17') have angular positioning elements (21, 22) which cooperate and which are configured prior to the thread connection being produced to enable an axial approach of a beginning of the thread of the outer thread to a thread entrance of the inner thread in at least one predetermined relative angular position between the inner
(Continued)

Figure 1:
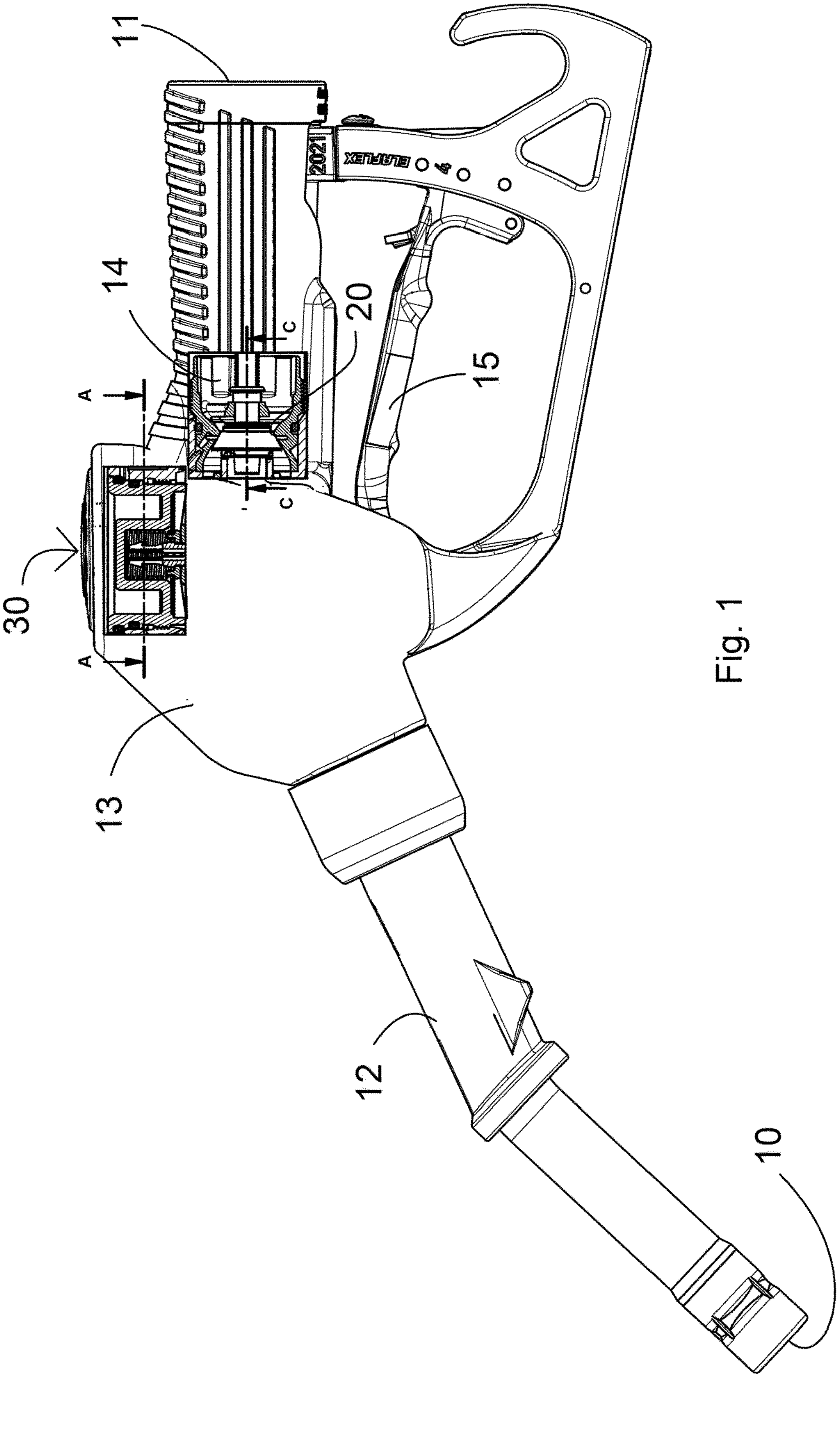

thread and the outer thread and to prevent this in those angular positions which are different from the at least one relative angular position. As a result of the angular positioning elements, the screwing-in operation can be significantly simplified and an axial adjustment path can be adjusted in a significantly more precise manner.

18 Claims, 3 Drawing Sheets

(58) Field of Classification Search
USPC ......... 141/386, 392; 411/418, 221; 285/391; 251/156
See application file for complete search history.

FUEL NOZZLE

The invention relates to a dispensing valve for dispensing a fluid, having a housing, a main channel which extends therein for the fluid, a main valve which is arranged in the main channel for controlling a fluid throughflow through the dispensing valve, a control device for activating the main valve, a component receiving member which is connected to the housing and which is provided with an inner thread and having an attachment which is provided with an outer thread. A thread connection is produced between the inner thread of the component receiving member and the outer thread of the attachment, wherein an axial position of the attachment can be adjusted by the outer thread being rotated relative to the inner thread.

The use of such dispensing valves is known in principle from the prior art. The attachment can, as set out in EP 2 096 080 B1, for example, be a main valve seat which is provided with an outer thread, wherein the thread connection is used to fix the main valve seat inside the main channel to a component receiving member which is provided with an inner thread.

To this end, a torque wrench is generally used so that a fitter can apply a desired torque to the main valve seat when the thread connection is produced. It can thus be ensured that the thread connection has sufficient strength. In addition, via the torque used, the axial force with which the attachment is pressed against a stop which is fixed relative to the component receiving member can be adjusted.

Based on this prior art, the object of the present invention is to provide a dispensing valve of the above-mentioned type, which has an improved thread connection which is easier to produce between the attachment and the component receiving member.

This object is achieved with the features of the independent claims. Advantageous embodiments are set out in the dependent claims. According to the invention, the component receiving member and the attachment have angular positioning elements which cooperate and which are configured prior to the thread connection being produced to enable an axial approach of the beginning of the thread of the outer thread to a thread entrance of the inner thread in at least one predetermined relative angular position between the outer thread and the inner thread and to prevent this in those angular positions which are different from the at least one relative angular position.

Firstly, some of the terms used in the context of the present description will be explained in greater detail. The terms “axial position” and “axial approach” relate to the longitudinal axis of the thread connection. Before the thread connection is produced, the inner thread can be moved closer to the outer thread in an axial direction without the outer thread having to be rotated relative to the inner thread for this purpose. During the production of the thread engagement, the outer thread is rotated relative to the inner thread, which leads to a displacement of the axial position of the attachment relative to the component receiving member.

The beginning of the thread of the outer thread and the thread entrance of the inner thread are in each case the portions of the respective thread which move into engagement with each other first when the thread connection is produced correctly. As a result of the beginning of the thread of the outer thread being moved axially closer to the thread entrance of the inner thread, the outer thread and the inner thread can thus be moved together in such a manner that, as a result of a subsequent rotation of the outer thread relative to the inner thread, the thread connection is produced. The at least one predetermined relative angular position may in particular be produced by means of one or more coherent angular ranges.

The fluid may in particular be a fluid which is liquid, gaseous or in a mixed phase (which has both a liquid and a gaseous portion).

As a result of the angular positioning elements, the outer thread of the attachment can be moved only in specific predetermined angular positions or angular ranges in an axial direction towards the inner thread since in other angular positions or angular ranges the threads are prevented from moving closer together. It may thereby be possible for the thread beginning prior to production of the thread connection in a defined angular position to be placed on the rear end of the inner thread in the screwing-in direction. This has the advantage that a subsequent rotation of the outer thread of the attachment relative to the inner thread of the component receiving member over a desired angular difference leads to a precisely determined thread engagement. In particular, the provision can be set for the fitter that in order to produce the thread connection a predetermined screwing-in angle has to be complied with or a predetermined number of rotations of the outer thread relative to the inner thread has to be carried out. The use of a torque wrench is consequently no longer required so that the assembly is considerably simplified. It is also possible to provide for the fitter depending on the prevailing installation situation (for example, depending on the dimensions of the attachment and/or the fitting of the dispensing valve) different rotation angles in each case in order to achieve a desired thread engagement.

Furthermore, in the context of the invention, it has been recognised that the provision of a specific torque, as a result of component tolerances which can influence the friction between the thread partners, can lead to an incorrect adjustment of the axial pressing force of the attachment relative to the component receiving member. In contrast, the thread engagement and consequently also the axial pressing force of the attachment as a result of the angular positioning elements according to the invention can be determined in a simple manner by the screwing-in angle or the number of rotations with a high degree of precision.

In the context of the invention, it is possible for the angular positioning elements to extend in the axial direction of the thread connection in such a manner that the outer thread during the axial approach is guided in a determined angular position in the axial direction of the thread connection until the thread beginning of the outer thread reaches the plane of the thread entrance of the inner thread. In principle, however, it is also sufficient for the angular positioning elements to determine the predetermined relative angular position in a first axial position, wherein this first axial position can be exceeded by the approach being continued, wherein in a second axial position which is taken up afterwards, a free rotation may be possible again. When the angular position is determined at least in the first axial position of the connection partners, the fitter can maintain this angular position during the continued approach.

The at least one predetermined relative angular position within which an axial approach of the thread beginning of the outer thread to a thread entrance of the inner thread is possible comprises in one embodiment an angular range which extends in a circumferential direction over an extent between 1° and 90°, preferably between 5° and 45°, more preferably between 10° and 30°. This angular range may be considered to be a tolerance range within which an axial approach of the connection partners is possible. The use of such a range is advantageous since the expanded angular range with respect to a single sharply defined angular position can be more readily found by the fitter and the assembly is thereby simplified.

In one embodiment, the angular positioning elements have a projection which is arranged on one of the attachment and component receiving member and a recess which is arranged on the other of the attachment and the component receiving member in each case and which corresponds to the projection. The projection may, for example, protrude outwards from an outer face of the attachment, wherein the recess may be located on an inner face of the component receiving member. Alternatively, the projection may also protrude inwards from an inner face of the component receiving member, wherein the recess may be located on an outer face of the attachment. The projection preferably corresponds to the recess, and is thus sized in such a manner that in the predetermined relative angular position during an axial movement of the attachment relative to the component receiving member can be guided into the recess and where applicable through it. The recess may in particular be formed by an interruption of the inner thread or outer thread.

In one embodiment, the recess and the projection extend in each case over a circumferential angular range, wherein the circumferential angular range of the recess is greater than the circumferential angular range of the projection. As a result of these features, the expanded relative angular range which has already been mentioned above and within which the axial approach is possible can be produced. When the projection extends over a smaller circumferential angular range than the recess, the projection has a degree of play within the recess so that the angular position of the outer thread relative to the inner thread does not have to be orientated precisely, but only within this play in order to place the outer thread on the inner thread prior to production of the thread connection in an axial direction.

For example, the circumferential angular range of the projection may be determined by an angle $\alpha$, wherein $\alpha$ is less than or equal to 45°, preferably less than or equal to 30°, more preferably less than or equal to 15°. Furthermore, the circumferential angular range of the recess may be determined by an angle $\beta=\alpha+x$, where x is in a range between 1° and 30°, preferably in a range between 5° and 20°, more preferably in a range between 10° and 15°.

The angular positioning elements preferably comprise at least two projections which are arranged on one of the attachment and the component receiving member and at least two recesses which correspond to the projections and which are arranged on the other of the attachment and the component receiving member in each case. The at least two projections and recesses are preferably arranged in a state distributed in a substantially uniform manner over the circumference of the attachment and the component receiving member. As a result of these measures, the projections can be used as a guide during the axial approach of the thread partners, whereby the risk of tilting is reduced.

The thread connection is configured with at least one turn. There may be provision for the thread connection to have two thread turns which are offset in a circumferential direction by an angular spacing, for example, by 180° with respect to each other. It is possible in this instance for the at least one predetermined relative angular position to comprise two predetermined relative angular positions or angular ranges which are also offset with respect to each other by this angular spacing. The angular spacing may in this instance be determined by the spacing of the centre points of the angular ranges. It is also possible for the thread connection to have three or more thread turns which are offset from each other by an angular spacing, wherein the at least one predetermined relative angular position may have a corresponding number of predetermined relative angular positions or angular ranges which are also offset from each other by a corresponding angular spacing. In an alternative embodiment, however, the number of predetermined relative angular positions or angular ranges which are offset from each other by an angular spacing may also be independent of the number of thread turns.

In one embodiment, the dispensing valve has an automatic switching-off device which is configured to move the main valve independently of the control device into a closure position when a fluid level reaches or exceeds the outlet end of the dispensing valve. The component receiving member may additionally have a receiving space in which the automatic switching-off device is at least partially inserted, wherein the attachment may be configured to cover the receiving space. Preferably, a pretensioning of the automatic switching-off device can be adjusted by rotating the outer thread of the attachment relative to the inner thread of the component receiving member. In particular, the automatic switching-off device may have a restoring element which can be pretensioned by means of a rotation of the outer thread of the attachment relative to the inner thread of the component receiving member. The switching-off device may additionally have a diaphragm which is constructed to be able to be moved in an axial direction of the thread connection in order to activate the switching-off device, wherein a pretensioning of the diaphragm can be adjusted by rotating the outer thread of the attachment relative to the inner thread of the component receiving member. In the embodiment described above, the precise adjustability of the adjustment path and the pressing force of the attachment relative to the component receiving member leads to the particular advantage that the pretensioning of the switching-off device can be adjusted in a particularly precise manner by a specific rotation angle or a specific number of rotations being predetermined for the fitter when screwing in the attachment. Another advantage is that, when diaphragms of different thicknesses are used, different rotation angles or a different number of rotations can be predetermined in order to be able to adjust the pretensioning acting on the diaphragm in an ideal manner. The operating method of an automatic switching-off device is known in principle from the prior art (see, for example, EP 2 386 520 B1) and is therefore not intended to be explained in greater detail in this instance.

In an alternative embodiment, the main valve has a valve seat, wherein the valve seat is connected to the attachment and wherein the component receiving member is constructed to position the valve seat in the main channel. The valve seat may be connected to the attachment in an integral manner, materially engaging manner or using any other type of connection. The valve seat may in this embodiment be screwed into the component receiving member, wherein the axial position of the valve seat and the pressing force of the valve seat relative to the component receiving member can be adjusted in a particularly precise manner by the positioning elements according to the invention.

In the context of the invention, it has further been recognised that with dispensing valves of the prior art, during the production of the thread connection between the attachment and the component receiving member, there is often an unnecessarily high number of rotations when the beginning of the thread of the attachment does not immediately strike the thread entrance of the component receiving member.

Another advantage of the angular positioning elements according to the invention is therefore that, as a result of the defined engagement of the thread partners, an unnecessarily high number of relative rotations can be prevented. This advantage is particularly evident in an embodiment in which a sealing element is arranged on an outer face of the attachment. The sealing element can be used to seal the attachment with respect to the component receiving member with respect to an environment of the attachment. A problem which occurs with previously known dispensing valves of this type is that, during the production or the release of the thread connection, friction occurs between the sealing element and the attachment and/or the component receiving member and/or the environment of the sealing element. The friction may in particular with frequent screwing-in and unscrewing of the attachment impair the sealing action and may make it necessary to replace the sealing element more often so that the maintenance complexity is increased.

By, as explained above, with the dispensing valve according to the invention, an unnecessarily large number of rotations being prevented, this friction can be considerably reduced.

Figure 3:
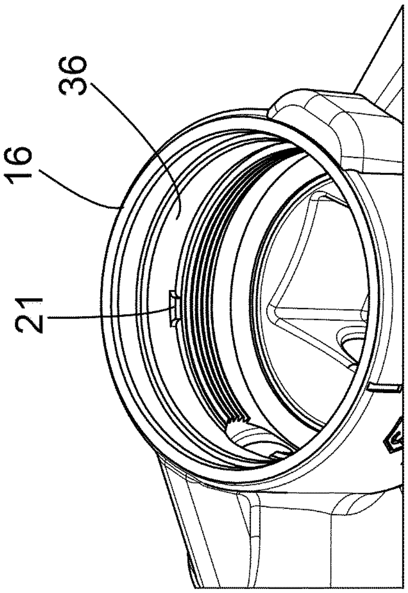
Figure 5:
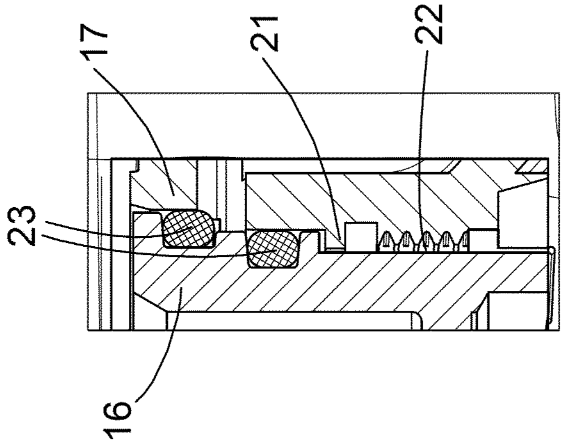
Figure 2:
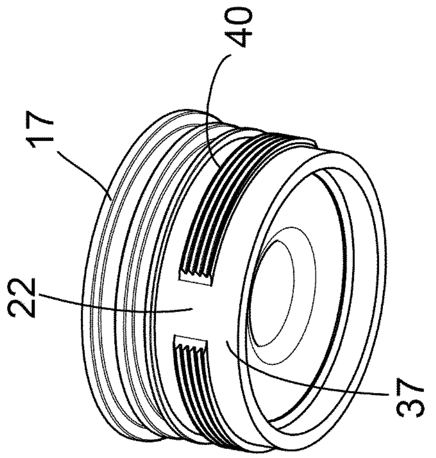
Figure 4:
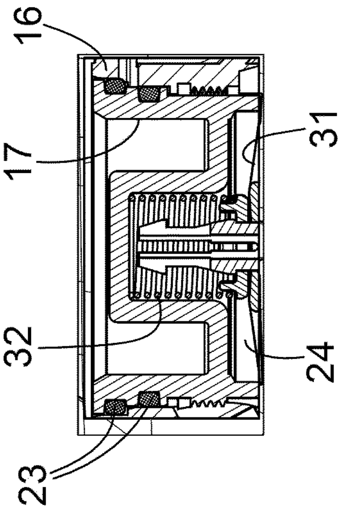
Figure 6:
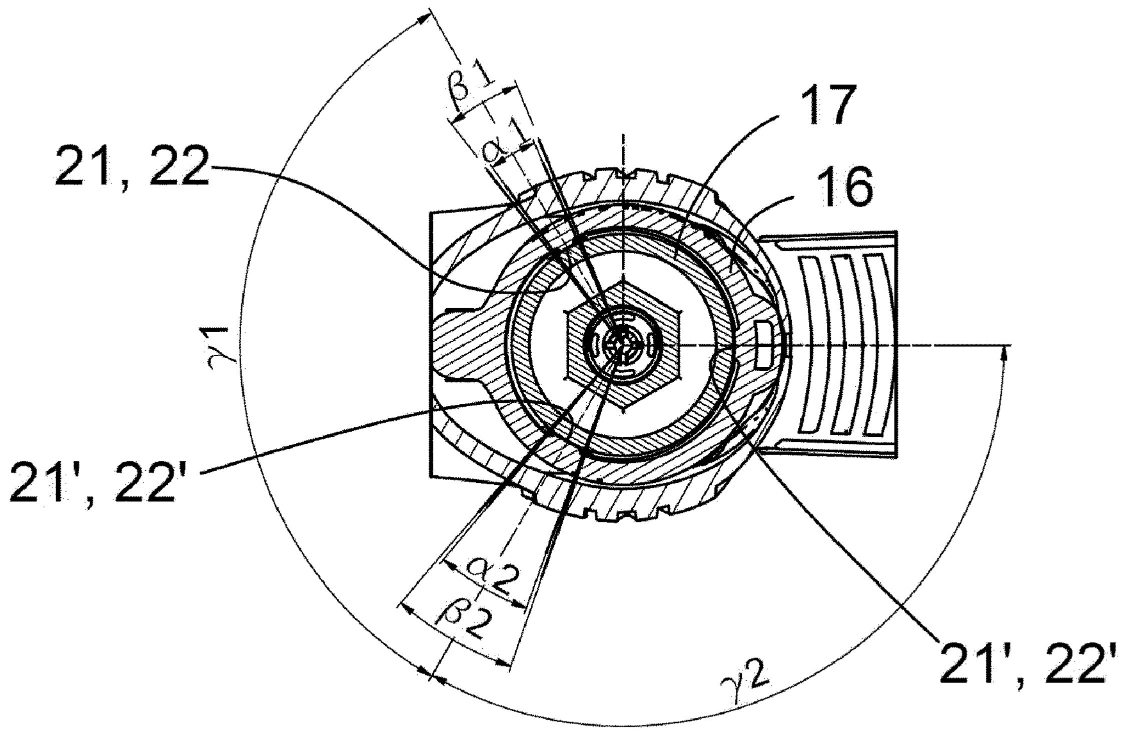
Figure 7:
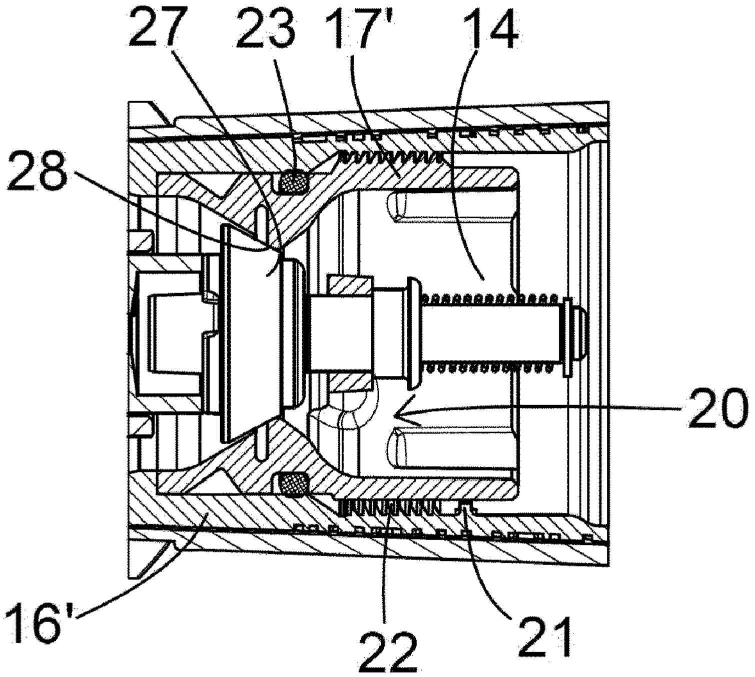

Advantageous embodiments of the invention will be explained by way of example below with reference to the appended drawings, in which:

FIG. 1: shows an exemplary embodiment of a dispensing valve according to the invention in a partially sectioned side view;

FIG. 2: shows an attachment of the embodiment shown in FIG. 1 as a three-dimensional view;

FIG. 3: shows a component receiving member of the embodiment shown in FIG. 1 as a three-dimensional view;

FIG. 4: shows a partial cut-out from FIG. 1 as an enlarged view;

FIG. 5: shows a partial cut-out from FIG. 4 as an enlarged view;

FIG. 6: shows a sectioned view of the embodiment of FIG. 1 along the line A-A;

FIG. 7: shows a partial cut-out from FIG. 1 as an enlarged view.

FIG. 1 shows a partially sectioned side view of a dispensing valve according to the invention which is constructed to dispense a fluid fuel. The dispensing valve comprises a housing 13 in which a discharge pipe 12 is inserted. The dispensing valve 13 further comprises an inlet end 11 for connecting a fluid supply and an outlet end 10 which is located at the downstream end of the discharge pipe 12 and which can be introduced, for example, into a tank of a motor vehicle in order to fill it. A main channel 14 of the dispensing valve extends from the inlet end 11 through the housing 13 and the discharge pipe 12 up to the outlet end 10. In order to control the fuel flow, there is located inside the main channel 14 a main valve 20 which can be activated by a control device 15, in this instance a manual lever, in known manner in order to regulate the fuel flow through the dispensing valve.

An automatic switching-off device 30 is further arranged in the housing 12. This device is constructed in known manner to move the main valve 20 independently from a position of the hand lever 15 into a closure position when a liquid level of the fuel reaches or exceeds the outlet end 10.

Both the main valve 20 and the automatic switching-off device 30 are in this instance positioned using thread connections according to the invention between an attachment which is provided with an outer thread and a component receiving member which is provided with an inner thread on the housing 13 of the dispensing valve. This is explained in detail below.

FIG. 2 shows an attachment 17 which is constructed in this instance as a cover of the automatic switching-off device 30 as a three-dimensional view obliquely from below. FIG. 3 shows a component receiving member 16 which is configured in this instance for receiving the automatic switching-off device 30 as a three-dimensional view obliquely from above. The attachment 17 may be screwed into the component receiving member 16 with a thread connection being produced. To this end, the attachment 17 comprises an outer thread and the component receiving member comprises an inner thread.

A projection 21 which protrudes inwards is arranged on an inner face 36 of the component receiving member 16. In addition, the attachment 17 has on the outer face 37 thereof a recess 22 which is formed by means of an interruption of the outer thread. The projection 21 and the recess 22 form angular positioning elements corresponding to each other. In addition to the angular positioning elements 21, 22 which can be seen in FIGS. 2 and 3, two additional projections and two corresponding recesses which cannot be seen in the views of FIGS. 2 and 3, but are shown in FIG. 6 are further present.

In order to produce a thread connection between the outer thread and the inner thread, a thread beginning of the outer thread (that is to say, the portion of the outer thread located at the front in the screwing-in direction) has to be introduced into a thread entrance of the inner thread (that is to say, the portion of the inner thread located at the rear in the screwing-in direction). So that the thread beginning can move closer to the thread entrance in an axial direction, an angular position of the projections 21 has to be moved into alignment with an angular position of the recesses 22 so that the projections 21 can be guided through the recesses 22. The relative angular position in which there is this alignment is also referred to in the context of the present description as a predetermined relative angular position. In other relative angular positions which differ from the predetermined relative angular position, the projections 21 strike the thread protuberances 40 of the outer thread and cannot be moved past the thread protuberances 40 so that the axial approach is prevented.

In the predetermined relative angular position, the projections 21 can be moved through the recesses so that the attachment 17 can be inserted into the component receiving member 16 until the thread beginning of the outer thread strikes the end of the inner thread located at the rear in the screwing-in direction. In this predetermined relative angular position, an angular position of the thread beginning is 5° away from an angular position of the thread entrance. After a corresponding rotation of the attachment 17 through 5°, the thread beginning is introduced into the thread entrance. A continued rotation subsequently leads to a defined thread engagement and to a defined axial adjustment path of the attachment 17 relative to the component receiving member 16.

In this instance, the threads of the attachment 17 and component receiving member 16 each have a thread turn. In alternative embodiments, the threads may also be configured with multiple turns, wherein in this instance, as a result of the use of symmetries, a plurality of predetermined relative angular positions, in which the thread beginning can be moved closer to the thread entrance in an axial direction, may be provided.

FIG. 4 shows a cut-out from FIG. 1 as an enlarged sectioned side view. The attachment 17 is in this view completely screwed into the component receiving member 16. In the view of FIG. 4, it can further be seen that there are arranged between the component receiving member 16 and the attachment 17 two sealing elements 23 which are configured in this instance as O-rings 23.

The attachment 17 forms a cover of the automatic switching-off device 30. The automatic switching-off device comprises a diaphragm space 24 which is located inside or below the component receiving member 17 and which is delimited by a diaphragm 31. The diaphragm 31 is constructed in known manner to be able to be moved in the longitudinal direction of the thread connection (cf. EP 2 386 520 B1) in order to activate the switching-off device 30. The sealing rings 23 prevent liquids or gases from being able to be introduced between the attachment 17 and the component receiving member 16. The diaphragm space 24 is thereby in particular sealed so that a defined pressure reduction can be maintained at that location. The automatic switching-off device further comprises a diaphragm spring 32 which serves to pretension the diaphragm. As a result of rotation of the attachment 17 relative to the component receiving member 16, a pretensioning can be adjusted.

When the attachment 17 is screwed into the component receiving member 16, the O-rings 23 are displaced in the longitudinal direction of the thread connection. In addition, during screwing-in, there is a relative rotation between at least one of the connection partners 16, 17 and the O-rings 23. The friction which is thereby produced leads to a wear of the O-rings. As a result of the angular positioning elements according to the invention, unnecessary screwing-in movements which occur, for example, when the fitter does not immediately find the thread entrance, can be prevented and the wear can consequently be significantly reduced. This is particularly advantageous since the automatic switching-off device 30 has to be regularly maintained, which requires a release of the thread connection between the component receiving member 16 and the attachment 17.

As a result of the angular positioning elements 21, 22 according to the invention, it is further not necessary when the thread connection is produced to predetermine a specific torque. Instead, in order to produce the thread connection, a rotation angle or a number of rotations which the fitter should carry out can be predetermined. The force transmission which is produced from the thread connection and the axial adjustment path of the attachment 17 relative to the component receiving member 16 can in this manner be adjusted in a particularly simple and precise manner. This also contributes to the reduction of the wear of the sealing rings.

FIG. 5 shows a partial cut-out from FIG. 4 as an enlarged illustration. In this illustration, the recess 22 of the attachment 16, the outer thread of the component receiving member 17 and the projection 21 can be seen.

FIG. 6 shows a sectioned view of the dispensing valve along the line A-A shown in FIG. 1. The line A-A illustrated in FIG. 1 extends through the projections 21. Accordingly, it can be seen in FIG. 6 that the component receiving member 16 has a total of three inwardly protruding projections 21 which are offset with respect to each other by an angle $\gamma 1 = \gamma 2 = 120°$. It can also be seen that the attachment 17 has three recesses 22 which correspond to the projections and which are formed by means of interruptions in the outer thread.

By the projections being distributed in a uniform manner in a circumferential direction, a tilting of the attachment 17 within the component receiving member during the introduction can be prevented.

The projections 21 and recesses 22 extend in each case in the circumferential direction over a circumferential angle. The projection 21 which is positioned at the top left in FIG. 6 extends over a circumferential angle $\alpha 1 = 8°$. The recess 22 which corresponds to this projection extends over a circumferential angle $\beta 1 = 13°$. The projections 21' which are positioned at the bottom left and right in FIG. 6 extend over a circumferential angle $\alpha 2 = 15°$ and the corresponding recesses 22' extend over a circumferential angle $\beta 2 = 20°$.

Since the recesses extend over a greater circumferential angle than the projections 21, there is a specific coherent angular range in this instance of approximately 5°, in which the projections 21, 21' can be guided through the respective recess 22, 22'. As a result of the different circumferential angles of the projections 21 and 21' or the recesses 22 and 22', the projections 21' cannot be guided through the recess 22. In this manner, there is only one single coherent predetermined relative angular range in which the projections 21 can be moved past the recesses 22 in relative terms. In an alternative embodiment, there may also be provision for the projections 21 and 21' to have the same extent in the circumferential direction. In order to nonetheless enable that the thread partners can be joined only in a single coherent predetermined relative angular range, the angles $\gamma 1$ and $\gamma 2$ may differ slightly from the angle of 120° (for example, by less than) 5°. This idea can naturally also be transferred to embodiments in which the number of projections and the corresponding recesses is two or more than three.

FIG. 7 shows a cut-out along the section C-C from FIG. 1 as an enlarged cross sectional view. In this cut-out, the main valve 20 of the dispensing valve according to the invention can be seen. The main valve 20 comprises a valve member 27 which in the position shown abuts against a valve seat 28. The valve seat 28 is in this instance connected in an integral manner to an attachment 17'. The attachment 17' is connected by means of a thread connection to a component receiving member 16'. The thread connection between the elements 16' and 17' is configured in a similar manner to the thread connection between the elements 16 and 17. In addition, the thread connection has positioning elements according to the invention which determine, as described above, a predetermined relative angular range, within which prior to production of the thread connection an axial approach of the connection partners is possible.

Between the component receiving member 16' and the attachment 17' there is arranged a sealing element 23 which prevents fluid from flowing past the outer side of the attachment 17'.

The component receiving member 16' serves to position and fix the attachment 17' and the valve seat 28 which is connected thereto in the main channel 14. For maintenance purposes, the attachment 17' can be disassembled by releasing the thread connection. As a result of the angular positioning elements according to the invention and the resultant precise adjustability of the thread connection between the component receiving member 16' and the attachment 17', it is ensured that the wear of the sealing element 23 is reduced and consequently the sealing action is maintained even after a large number of maintenance operations. In addition, the magnitude of the pressing force which the attachment 17' applies to the component receiving member 16' can be adjusted in a particularly precise manner.

The invention claimed is:

1. A dispensing valve for dispensing a fluid, having a housing (13), a main channel (14) which extends therein for the fluid, a main valve which is arranged in the main channel (14) for controlling a fluid throughflow through the dispensing valve, a control device (15) for activating the main valve (20), a component receiving member (16, 16') which is connected to the housing (13) and which is provided with an inner thread and having an attachment (17, 17') which is provided with an outer thread, wherein between the inner thread and the outer thread, a thread connection is produced and wherein an axial position of the attachment (17, 17') can be adjusted by the inner thread being rotated relative to the outer thread, characterised in that the component receiving member (16, 16') and the attachment (17, 17') have angular positioning elements (21, 22) which cooperate and which are configured prior to the thread connection being produced to enable an axial approach of a beginning of the thread of the outer thread to a thread entrance of the inner thread in at least one predetermined relative angular position between the inner thread and the outer thread and to prevent this in those angular positions which are different from the at least one relative angular position.

2. The dispensing valve according to claim 1, wherein the at least one predetermined relative angular position comprises an angular range, which has in a circumferential direction an extent between 1° and 90°.

3. The dispensing valve according to claim 2, wherein the extent is between 5° and 45°.

4. The dispensing valve according to claim 3, wherein the extent is between 10° and 30°.

5. The dispensing valve according to claim 1, wherein the angular positioning elements (21, 22) have a projection (21) which is arranged on one of the attachment (17, 17') and component receiving member (16, 16') and a recess (22) which is arranged on the other of the attachment (17, 17') and the component receiving member (16, 16') in each case and which corresponds to the projection (21).

6. The dispensing valve according to claim 5, wherein the recess (22) is formed by an interruption of the inner thread or the outer thread.

7. The dispensing valve according to claim 5, wherein the recess (22) and the projection (21) extend in each case over a circumferential angular range, wherein the circumferential angular range of the recess (22) is greater than the circumferential angular range of the projection (21).

8. The dispensing valve according to claim 7, wherein the circumferential angular range of the projection (21) is provided by an angle $\alpha$, where $\alpha \leq 45°$, wherein the circumferential angular range of the recess (22) is determined by an angle $\beta = \alpha + x$, where x is in a range between 1° and 30°.

9. The dispensing valve according to claim 5, wherein the angular positioning elements (21, 22) have at least two projections (21) which are arranged on one of the attachment (17, 17') and the component receiving member (16, 16') and at least two recesses (22) which correspond to the projections (21) and which are arranged on the other of the attachment (17, 17') and the component receiving member (16, 16') in each case.

10. The dispensing valve according to claim 1, wherein the at least one predetermined relative angular position is determined by precisely one coherent angular range.

11. The dispensing valve according to claim 1, wherein the thread connection has two or more thread turns which are offset from each other by an angular spacing.

12. The dispensing valve according to claim 1, which further has an automatic switching-off device (30) which is configured to move the main valve (20) independently of the control device (15) into a closure position when a fluid level reaches or exceeds the outlet end (10) of the dispensing valve, wherein the component receiving member has a receiving space in which the automatic switching-off device (30) is at least partially inserted, wherein the attachment (17) is configured to cover the receiving space, wherein a pretensioning of the automatic switching-off device can be adjusted by rotating the attachment (17) relative to the component receiving member (16).

13. The dispensing valve according to claim 12, wherein the automatic switching-off device (30) further has a diaphragm (31) which can be moved in an axial direction of the thread connection in order to activate the switching-off device (30), wherein a pretensioning of the diaphragm (31) can be adjusted by rotating the attachment (17) relative to the component receiving member (16).

14. The dispensing valve according to claim 1, wherein the main valve (20) has a valve seat (28), wherein the valve seat (28) is connected to the attachment (17') and wherein the component receiving member (16') is constructed to position the valve seat (28) in the main channel (14).

15. The dispensing valve according to claim 8, wherein x is in a range between 5° and 20°.

16. The dispensing valve according to claim 15, wherein x is in a range between 10° and 15°.

17. The dispensing valve according to claim 9, wherein the at least two projections (21) and recesses (22) are arranged in a state distributed in a substantially uniform manner over the circumference of the attachment and the component receiving member.

18. The dispensing valve according to claim 11, wherein the at least one predetermined relative angular position has a corresponding number of predetermined relative angular positions or angular ranges which are offset from each other by the same angular spacing.

* * * * *